United States Patent
Jacobsen et al.

(10) Patent No.: US 10,607,117 B2
(45) Date of Patent: Mar. 31, 2020

(54) DEEP RECEPTIVE FIELD NETWORKS

(71) Applicant: KEPLER VISION TECHNOLOGIES B.V., Amsterdam (NL)

(72) Inventors: Jorn-Henrik Jacobsen, Amsterdam (NL); Johannes Christianus Van Gemert, Amsterdam (NL); Reinier Van Den Boomgaard, Amsterdam (NL); Zhongyu Lou, Amsterdam (NL); Arnoldus Wilhelmus Maria Smeulders, Amsterdam (NL)

(73) Assignee: KEPLER VISION TECHNOLOGIES B.V., Amsterdam (NL)

( * ) Notice: Subject to any disclaimer, the term of this patent is extended or adjusted under 35 U.S.C. 154(b) by 0 days.

(21) Appl. No.: 15/579,917

(22) PCT Filed: Jun. 3, 2016

(86) PCT No.: PCT/NL2016/050399
§ 371 (c)(1),
(2) Date: Dec. 5, 2017

(87) PCT Pub. No.: WO2016/195496
PCT Pub. Date: Dec. 8, 2016

(65) Prior Publication Data
US 2018/0225550 A1     Aug. 9, 2018

(30) Foreign Application Priority Data

Jun. 5, 2015  (NL) ................................... 2014933
Jul. 3, 2015  (NL) ................................... 2015087

(51) Int. Cl.
*G06K 9/62*  (2006.01)
*G06N 3/08*  (2006.01)
(Continued)

(52) U.S. Cl.
CPC ......... *G06K 9/6262* (2013.01); *G06K 9/4619* (2013.01); *G06K 9/6256* (2013.01);
(Continued)

(58) Field of Classification Search
CPC ........ G06K 9/6262; G06N 20/00; G06N 3/04; G06N 3/0454; G06N 3/088
See application file for complete search history.

(56) References Cited

U.S. PATENT DOCUMENTS

| | | | | |
|---|---|---|---|---|
| 7,921,383 | B1 * | 4/2011 | Wei | G03F 7/705 |
| | | | | 703/13 |
| 2014/0355861 | A1 | 12/2014 | Nirenberg et al. | |
| 2017/0278513 | A1 * | 9/2017 | Li | G10L 15/16 |

FOREIGN PATENT DOCUMENTS

CN     103996056 A     8/2014

OTHER PUBLICATIONS

Montavon, G., Lapuschkin, S., Binder, A., Samek, W., & Müller, K. (Nov. 30, 2016). "Explaining nonlinear classification decisions with deep Taylor decomposition." Retrieved Feb. 18, 2019, from https://www.sciencedirect.com/science/article/pii/S0031320316303582?via=ihub (Year: 2016).*

(Continued)

*Primary Examiner* — Ross Varndell
(74) *Attorney, Agent, or Firm* — AEON Law, PLLC; Adam L. K. Philipp; David V. H. Cohen

(57) ABSTRACT

The invention provides a method for recognition of information in digital image data, said method comprising a learning phase on a data set of example digital images having known information, and characteristics of categories are computed automatically from each example digital image and compared to its known category, said method comprises training a convolutional neural network comprising network parameters using said data set, in which via deep learning each layer of said convolutional neural net- (Continued)

work is represented by a linear decomposition of all filters as learned in each layer into basis functions.

5 Claims, 5 Drawing Sheets

(51) Int. Cl.
G06N 3/04 (2006.01)
G06K 9/46 (2006.01)
G06N 20/00 (2019.01)

(52) U.S. Cl.
CPC ............. *G06K 9/6273* (2013.01); *G06N 3/04* (2013.01); *G06N 3/0454* (2013.01); *G06N 3/084* (2013.01); *G06N 3/088* (2013.01); *G06N 20/00* (2019.01)

(56) References Cited

OTHER PUBLICATIONS

Hao Zhang, A. C. Berg, M. Maire and J. Malik, "SVM-KNN: Discriminative Nearest Neighbor Classification for Visual Category Recognition," 2006 IEEE Computer Society Conference on Computer Vision and Pattern Recognition (CVPR'06), New York, NY, USA, 2006, pp. 2126-2136. doi: 10.1109/CVPR.2006.301 (Year: 2006).*

Lee et al. "Convolutional Deep Belief Networks for Scalable Unsupervised Learning of Hierarchical Representations." Proceedings of the 26th Annual International Conference on Machine Learning, ICML '09, Jan. 1, 2009 (Jan. 1, 2009), pp. 1-8, XP055252280, New York, New York, USA (Year: 2009).*

Honglak Lee et al, "Convolutional Deep Belief Networks for Scalable Unsupervised Learning of Hierarchical Representations", Proceedings of the 26th Annual International Conference on Machine Learning, ICML '09, Jan. 1, 2009 (Jan. 1, 2009), pp. 1-8, XP055252280, New York, New York, USA DOI: 10.1145/1553374.1553453, ISBN: 978-1-60558-516-1, Title, 4.1-4.2. 3.5, Figure 3, Table 1, formulas (1)-(4).

Joan Bruna et al, "Classification with Invariant Scattering Representations", Arxiv. Org, Cornell University Ithaca, NY 14853, Dec. 6, 2011 (Dec. 6, 2011), XP080555322, 2, 2.3 Figure 3.

Marc'Aurelio Ranzato et al, "Unsupervised Learning of Invariant Feature Hierarchies with Applications to Object Recognition", CVPR '07. IEEE Conference on Computer Vision and Pattern Recognition, Jun. 18-23, 2007, Minneapolis, MN, USA, IEEE, Piscataway, NJ, USA, Jun. 1, 2007 (Jun. 1, 2007), pp. 1-8, XP031144414, ISBN: 978-1-4244-1179-54, specifically the second column, second paragraph and 6, first paragraph as well as Figure 4.

Sebastian Bach et al, "On Pixel-Wise Explanations for Non-Linear Classifier Decisions by Layer-Wise Relevance Propagation", PLOS One, vol. 10, No. 7, Jul. 10, 2015 (Jul. 10, 2015), pp. 1-46, XP055228791, US, ISSN: 1932-6203, DOI: 10.1371/journal.pone. 0130140, pp. 8-9 and 19.

Quoc V Le et al, "Tiled Convolutional Neural Networks", Advances in Neural Information Processing Systems 23, Dec. 31, 2010 (Dec. 31, 2010), pp. 1279-1287, XP055168826, Retrieved from the Internet: URL: http://ai.stanford.edu/~ang/papers/nips10-TiledConvolutionalNeuralNetworks.pdf [retrieved on Feb. 10, 2015].

Yujia Li et al, "Generative Moment Matching Networks", Arxiv. Org, Cornell University Library, 201 Olin Library Cornell University Ithaca, NY 14853, Feb. 10, 2015 (Feb. 10, 2015), XP080677536.

Karen Simonyan et al: "Deep Inside Convolutional Networks: Visualising Image Classification Models and Saliency Maps", Dec. 20, 2013 (Dec. 20, 2013), XP055226059, Retrieved from the Internet: URL: http://arxiv.org/pdf/1312.6034v2.pdf [retrieved on Nov. 5, 2015].

Cha Zhang and Zhengyou Zhang Ed—Cha Zhang and Zhengyou Zhang: "Boosting-Based Face Detection and Adaptation", Sep. 1, 2010 (Sep. 1, 2010), Boosting-Based Face Detection and Adaptation (Book Series: Synthesis Lectures on Computer Vision), Morgan & Claypool Publishers Series, p. 140PP, XP008130361, ISBN: 978-60845-133-3.

* cited by examiner (a) CIFAR-10

(b) MNIST

DEEP RECEPTIVE FIELD NETWORKS

FIELD OF THE INVENTION

The invention relates to a method for recognition of information in digital image data, a device for recognition of categorical information from digital image data, and a computer program product which, when running on a data processor, provides categorising a digital image.

BACKGROUND OF THE INVENTION

The amount of digital image data grows exponentially in time. The available amount of digital image data, available on the internet, for instance, is huge. Various methods are proposed for searching in this digital image data.

Currently, a computational approach that is used to category recognition applies convolutional neural networks.

In a learning phase, these networks have large numbers of parameters to learn. This is their strength, as they can solve extremely complicated problems. At the same time, the large number of parameters is a limiting factor in terms of the time needed and of the amount of data needed to train them (A. Krizhevsky, I. Sutskever, and G. E. Hinton. Imagenet classification with deep convolutional neural networks. NIPS, 2012; A. Coates and A. Y. Ng. Selecting receptive fields in deep networks. NIPS, 2011). For the computation time, the GoogLenet architecture (C. Szegedy, W. Liu, Y. Jia, P. Sermanet, S. Reed, D. Anguelov, D. Erhan, V. Vanhoucke, and A. Rabinovich. Going deeper with convolutions. arXiv: 1409.4842, 2014) trains up to 21 days on a million images in a thousand classes on top notch GPU's to achieve a 4% top-5-error.

For many practical small data problems, pre-training on a large general dataset is an alternative, or otherwise unsupervised pre-training on subsets of the data.

In the literature, an elegant approach to reduce model complexity has been proposed by J. Bruna and S. Mallat. Invariant scattering convolution networks. IEEE T-PAMI, 35(8):1872-1885, 2013. By the convolutional scattering network cascading Wavelet transform convolutions with nonlinearity and pooling operators. On various subsets of the MNIST benchmark, they show that this approach results in an effective tool for small dataset classification. The approach computes a translation-invariant image representation, stable to deformations, while avoiding information loss by recovering wavelet coefficients in successive layers yielding state-of-the-art results on handwritten digit and texture classification, as these datasets exhibit the described invariants. However, the approach is also limited in that one has to keep almost all possible cascade paths (equivalent to all possible filter combinations) according to the model to achieve general invariance. Only if the invariance group, which solves the problem at hand is known a priori, one can hard code the invariance network to reduce the feature dimensionality. This is effective when the problem and its invariances are known precisely, but for many image processing applications this is rarely the case. And, the reference does allow for infinite group invariances.

Other attempts to tackle the complicated and extensive training in convolutional neural networks rely heavily on regularization and data augmentation for example by dropout. The Maxout networks (Ian J Goodfellow, David Warde-Farley, Mehdi Mirza, Aaron Courville, and Yoshua Bengio. Maxout networks. arXiv preprint arXiv:1302.4389, 2013) leverage dropout by introducing a new activation function. The approach improved state of the art results on different common vision benchmarks. Another perspective on reducing sample complexity has been made by Robert Gens and Pedro M Domingos, Deep symmetry networks, In Advances in neural information processing systems, pages 2537-2545, 2014, by introducing deep symmetry networks. These networks apply non-fixed pooling over arbitrary symmetry groups and have been shown to greatly reduce sample complexity compared to convolutional neural networks on NORB and rotated MNIST digits when aggregated over the affine group. Also focussing on modelling invariants is the convolutional kernel network approach introduced by J. Mairal, P. Koniusz, Z. Harchaoui, and C. Schmid. Convolutional kernel networks. NIPS, 2014, which learns parameters of stacked kernels. It achieves impressive classification results with less parameters to learn than a convolutional neural networks.

J. Bruna and S. Mallat. Invariant scattering convolution networks. IEEE T-PAMI, 35(8):1872-1885, 2013, according to the abstract: A wavelet scattering network computes a translation invariant image representation, which is stable to deformations and preserves high frequency information for classification. It cascades wavelet transform convolutions with non-linear modulus and averaging operators. The first network layer outputs SIFT-type descriptors whereas the next layers provide complementary invariant information which improves classification. The mathematical analysis of wavelet scattering networks explain important properties of deep convolution networks for classification. A scattering representation of stationary processes incorporates higher order moments and can thus discriminate textures having same Fourier power spectrum. State of the art classification results are obtained for handwritten digits and texture discrimination, with a Gaussian kernel SVM and a generative PCA classifier. This requires a complete set of filters, and/or knowledge of the data set in order to select the relevant filters. Furthermore, rotation, scaling and other need to be taken into account.

HONGLAK LEE ET AL: "Convolutional deep belief networks for scalable unsupervised learning of hierarchical representations", PROCEEDINGS OF THE 26TH ANNUAL INTERNATIONAL CONFERENCE ON MACHINE LEARNING, ICML '09, pp. 1-8, according to its abstract discloses that there has been much interest in unsupervised learning of hierarchical generative models such as deep belief networks. Scaling such models to full-sized, high-dimensional images remains a difficult problem. To address this problem, we present the convolutional deep belief network, a hierarchical generative model which scales to realistic image sizes. This model is translation-invariant and supports efficient bottom-up and top-down probabilistic inference. Key to our approach is probabilistic max-pooling, a novel technique which shrinks the representations of higher layers in a probabilistically sound way. Our experiments show that the algorithm learns useful high-level visual features, such as object parts, from unlabeled images of objects and natural scenes. We demonstrate excellent performance on several visual recognition tasks and show that our model can perform hierarchical (bottom-up and top-down) inference over full-sized images.

JOAN BRUNA ET AL: "Classification with Invariant Scattering Representations", ARXIV.ORG, CORNELL UNIVERSITY LIBRARY, 201 OLIN LIBRARY CORNELL UNIVERSITY ITHACA, N.Y. according to its abstract discloses that scattering transform defines a signal representation which is invariant to translations and Lipschitz continuous relatively to deformations. It is implemented with a non-linear convolution network that iterates over wavelet and modulus operators. Lipschitz continuity locally linearizes deformations. Complex classes of signals and textures can be modeled with low-dimensional affine spaces, computed with a PCA in the scattering domain. Classification is performed with a penalized model selection. State of the art results are obtained for handwritten digit recognition over small training sets, and for texture classification.

MARC 'AURELIO RANZATO ET AL: "Unsupervised Learning of Invariant Feature Hierarchies with Applications to Object Recognition", CVPR '07. IEEE CONFERENCE ON COMPUTER VISION AND PATTERN RECOGNITION; 18-23 Jun. 2007; MINNEAPOLIS, Minn., USA, IEEE, PISCATAWAY, N.J., USA, pp 1-8, according to its abstract discloses to present an unsupervised method for learning a hierarchy of sparse feature detectors that are invariant to small shifts and distortions. The resulting feature extractor consists of multiple convolution filters, followed by a feature-pooling layer that computes the max of each filter output within adjacent windows, and a point-wise sigmoid non-linearity. A second level of larger and more invariant features is obtained by training the same algorithm on patches of features from the first level. Training a supervised classifier on these features yields 0.64% error on MNIST, and 54% average recognition rate on Caltech 101 with 30 training samples per category. While the resulting architecture is similar to convolutional networks, the layer-wise unsupervised training procedure alleviates the over-parameterization problems that plague purely supervised learning procedures, and yields good performance with very few labeled training samples.

SUMMARY OF THE INVENTION

The invention seeks to reduce computation, and/or the possibility to use reduced data sets.

The invention pertains to a method for recognition of information in digital image data, said method comprising a learning phase on a data set of example digital images having known information, and characteristics of categories are computed automatically from each example digital image and compared to its known category, said method comprises training a convolutional neural network comprising network parameters using said data set, in which via deep learning each layer of said convolutional neural network is represented by a linear decomposition of all filters as learned in each layer into basis functions.

The invention further pertains to a computer program product for classification of data having local coherence, in particular spatial coherence, for instance data selected from images, time series, and speech data, said computer program product comprising a deep receptive field network, comprising a filter kernel comprising a linear combination of basis functions.

The invention further pertains to a computer program product for classification of data having local coherence, in particular spatial coherence, for instance data selected from images, time series, and speech data, said computer program product comprising a deep convolutional neural network comprising receptive field functions, wherein said receptive field functions comprise a linear combination of functional complete basis functions.

In an embodiment of the computer program product said neural network comprise weights that are learnt using a sample dataset, in particular said weights are learned for a whole patch at once.

In an embodiment of the computer program product said neural network comprises a or said kernel that is a linear combination of basis functions:

$$F(x,y) = \alpha_1 \phi_1 + \ldots + \alpha_n \phi_n$$

wherein in particular φi is a complete set of basis functions, with the parameters of the convolutional layers are the parameters of the parameters α.

Using this method and device, a reduction of computation is possible: The new architecture enables us to reduce the number of convolutions by an order of magnitude while not loosing signal expressiveness in the model. Reduction of computation leads to the requirement of less (battery) power to achieve the same recognition accuracy.

Furthermore, the method and device are usable on small datasets while being as good as others on big data set: The new network converges in substantially less epochs, improving on the standard benchmarks for small data training sets. In addition the method is better compared to convolutional scattering for small and big sample sizes on MNIST.

The computer program product can be implemented into a method or a device for classification and/or for regression analysis. The data is in particular multi dimensional In the current application, it is aim to devise an algorithm combining the best of both worlds: a basis different from the wavelet-basis to achieve a low-data learning capacity, while still achieving the full learning capacity of the convolutional neural net approach without the need to specify the invariance classes a priori.

The many attempts to reduce model complexity, to reduce sample complexity, to regularize models more effectively, or to reduce training time of the convolutional neural networks approach, may all be implemented independently in the current method as well. In the experiments, the focus is on the simplest comparison, that is of the standard convolutional neural networks with the standard receptive field net without these enhancements on neither side.

In the art, if a dataset has other sources of variability due to the action of other finite Lie groups such as rotations, then this variability can be eliminated with an invariant scattering computed by cascading wavelet transforms defined on these groups. However, signal classes may also include complex sources of variability that cannot be approximated by the action of a finite group, as in CalTech101 or Pascal databases. This variability must be taken into account by unsupervised optimizations of the representations from the training data. Deep convolution networks which learn filters from the data, like in the current invention, have the flexibility to adapt to such variability.

The invention relates to neural networks that apply convolution to data of data sets. A set of images are an example of such data sets. Images usually have data that has a spatial coherence. The neural network applies convolution using a set of filters. In the art, this set needs to be complete, or information regarding the data is needed in order to select the right filter set to start with. Here, a set of basis function is used with which the filters are defined. It was found that the filters can be described using the set of basis functions. Furthermore or alternatively, when the fitting accuracy needs to be higher, for fitting higher order information, the basic functions can be set more accurate. In combination or alternatively, the basis functions can be expanded to more of the relatively standard basis functions. This without using knowledge of the data set.

In an embodiment, the network parameters of the convolutional layers are parameters expressing the weights of each member in a set of basis functions selected from a Taylor expansion and a Hermite expansion, for providing approximators for a local image structure by adapting said network parameters during training. In an embodiment, wavelets can also constitute a basis for the receptive field network. To that end, all basis can be rewritten into each other, so it takes some steps from Taylor to Hermite basis. If a infinite number of elements of the Hermite expansion are kept, it can be rewritten as wavelets.

In an embodiment, the method further comprises preprograming the basis functions in the network as Gaussian-shaped filters to decompose the filters.

In an embodiment, the method comprises using a receptive field network (RFnet) including a convolution kernel $F(x; y)$ of the form $F(x; y)=Gs(x; y)f(x; y)$, where Gs is a Gaussian function that serves as an aperture defining the local neighbourhood.

In an embodiment, a set of monomial basis functions:

$$1, x, y, \frac{1}{2!}x^2, xy, \frac{1}{2!}y^2, \frac{1}{3!}x^3, \frac{1}{2!}x^2y, \frac{1}{2!}xy^2, \frac{1}{3!}y^3, \ldots$$

are used for the learning function values, or functionally simpler functions that turn up in a Taylor series expansion of the function f.

In an embodiment, the to be learned parameters $\alpha_m$ as follows:

$$B_0=G^s;\ B_1=G^sx;\ B_2=G^sy;\ \alpha_0=f(0);\ \alpha_1=f_x(0);\ \alpha_2=f_y(0) \quad (2)$$

where the derivatives f at that position with index indicating their order are measured by the Gaussian linear filter of the same derivative order.

The invention further relates to a method for recognition of categorical information from digital image data, said method comprising providing a trained neural network, trained using the method above.

The invention further relates to a device for recognition of categorical information from digital image data, comprising a computer system comprising a computer program product with, when running on said computer system, applies a trained neural network derived according to the method described above.

The invention further relates to a computer program product which, when running on a data processor, performs the method described above.

The invention further relates to a method for recognition of information in digital image data, said method comprising deriving a convolutional neural network architecture based on receptive field filter family as a basis to approximate arbitrary functions representing images by at least one selected from Taylor series expansion and Hermite functional expansion.

Recognition of Categories in Digital Images

In the recognition of categorical information as machine-learned from digital image data, convolutional neural networks are an important modern tool. "Recognition of categorical information" in this sentence means to say that a label (for example "cow", "refrigerator", "birthday party", or any other category attached to a digital picture; the category may refer to an object in the digital image or it may refer to a condition in the scene). Thus, in fact, data that comprises locally coherent data can be binned. Often, such bins are discrete, like the label or category example above. It is also possible to categorise the data in multidimensional bins. Examples are for instance "small-medium-large" to an object. In fact, the network can even categorize on the basis of information that is continuous, for instance a continuous variable like size. In such a categorisation, regression analysis is possible. In this respect, data that comprises locally coherency relates to data that can be multi-dimensional. This data in at least one dimension has data points that are coherent in an area around at least one of its data points. Examples of such data are images, video (which has position coherence and time coherence), speech data, time series. Data points hold some information on their neighbouring data points.

Purpose

This is the purpose of recognition: to automatically label a yet-unseen image from features and characteristics computed from the digital image alone.

Learning and Application Phases

The process of recognition of categorical information consists of two steps: a learning phase and an application phase. In the processing of the learning phase, unique characteristics of categories are derived automatically from the features computed from each example digital image and compared to its known category (i.e. a stack of digital pictures each labelled "cow", a stack of digital pictures each labelled "refrigerator", etc. for all categories involved). These characteristics derived from features are transferred to the application phase. In the processing of the application phase, the same features are computed from an unknown image. By computation on the features again, it is established whether these features include the unique characteristics of a category A. If so, the unknown image is automatically labelled with this category A.

Introduction to the New Approach

Convolutional neural network learning can be seen as a series of transformations of representations of the original data. Images, as well as signals in general, are special in that they demonstrate spatial coherence, being the correlation of the value of a pixel with the values in the pixel's neighbourhood almost everywhere. (Only at the side of steep edges it remains undecided whether a pixel belongs to one side or to the other. The steepness of camera-recorded edges is limited by the bandwidth, as a consequence of which the steepest edges will not occur in practice.) When looking at the intermediate layers of convolutional neural networks, the learned image filters are spatially coherent themselves, not only for the first layers [Mallat] but also for all but the last, fully-connected layers, although there is nothing in the network itself which forces the filters into spatial coherence. See FIG. 1, for an illustration of intermediate layers.

Approach

Different from standard convolutional neural nets we pre-program the layers of the network with Gaussian-shaped filters to decompose the image as a linear decomposition onto a local (Taylor- or Hermite-) functional expansion.

The invention further relates to a method for recognition of information in digital image data, said method comprising a learning phase on a data set of example digital images having known information, and characteristics of categories are computed automatically from each example digital image and compared to its known category, said method comprises training a convolutional neural network comprising network parameters using said data set, in which via deep learning each layer of said convolutional neural network is represented by a linear decomposition of all filters as learned in each layer into basis functions.

The person skilled in the art will understand the term "substantially" in this application, such as in "substantially encloses" or in "substantially extends up to". The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The probe herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to a probe or parts thereof comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, showing an embodiment of a construction element, and showing in.

The drawings are not necessarily on scale.

DESCRIPTION OF PREFERRED EMBODIMENTS

Figure 1:
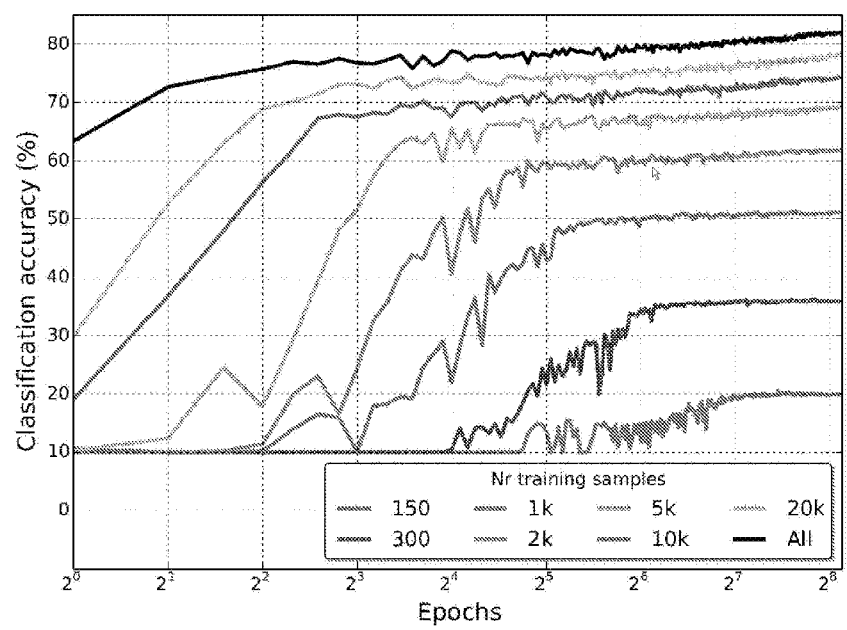
FIG. 1 State of the art convnet trained on random subsets of CIFAR-10.

Convolutional neural networks have large numbers of parameters to learn. This is their strength as they can solve extremely complicated problems. At the same time, the large number of parameters is a limiting factor in terms of the time needed and of the amount of data needed to train them (Krizhevsky et al., 2012; Coates et al., 2011). For the computation time, the GoogLenet architecture trains up to 21 days on a million images in a thousand classes on top notch GPU's to achieve a top-5-error. For limited data availability the small experiment in FIG. 1 quantifies the loss in performance relative to an abundance of data. For many practical small data problems, pretraining on a large general dataset is an alternative, or otherwise unsupervised pretraining on subsets of the data, but naturally training will be better when data are of the same origin and the same difficulty are being used. Therefore, the reduction of the effective number of free parameters is of considerable importance for the computation time and classification accuracy of low-data problems The recent review in Nature describes deep learning as a series of transformations of representations of the original data. We aim to use this definition in its most direct form for images. Images, as signals in general, are special in that they demonstrate spatial coherence, being the correlation of the value of a pixel with the values in the pixels neighbourhood almost everywhere. (Only at the side of steep edges it remains undecided whether a pixel belongs to one side or to the other. The steepness of camera-recorded edges is limited by the bandwidth, as a consequence of which the steepest edges will not occur in practice.) When looking at the intermediate layers of convnets, the learned image filters are spatially coherent themselves, not only for the first layers but also for all but the last, fully-connected layer, although there is nothing in the network itself which forces the filters into spatial coherence. See FIG. 2, for an illustration from the intermediate layers 1 to 5.

Figure 2:
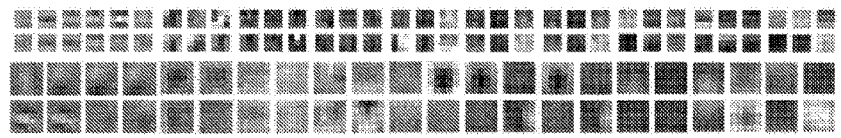
FIG. 2 filters randomly sampled from all layers of the GoogLenet model, from left to right layer number increases.

In FIG. 2, Filters are randomly sampled from all layers of the GoogLenet model (see Szegedy, W. Liu, Y. Jia, P. Sermanet, S. Reed, D. Anguelov, D. Erhan, V. Vanhoucke, and A. Rabinovich. Going deeper with convolutions. arXiv: 1409.4842, 2014), from left to right layer depth increases. Without being forced to do so, the model exhibits spatial coherence (seen as smooth functions almost everywhere) after being trained on ImageNet. This behaviour reflects the spatial coherence in natural images. It supports the assumption that higher layer feature maps can be seen as sufficiently smooth representations themselves.

In higher layers, the size of the coherent patches may be smaller indeed, the layer still shows coherence. We take this observation and deep learn the representation at each layer by a linear decomposition onto basis functions as they are known to be a compact approximation to locally smooth functions. This local (Taylor- or Hermite-) functional expansion is the basis of our approach.

In the literature, an elegant approach to reduce model complexity has been proposed by Bruna et al. by the convolutional scattering network cascading Wavelet transform convolutions with nonlinearity and pooling operators. On various subsets of MNIST, they show that this approach results in an effective tool for small dataset classification. The approach computes a translation invariant image representation, stable to deformations, while avoiding information loss by recovering wavelet coefficients in successive layers yielding state-of-the-art results on handwritten digit and texture classification, as these datasets exhibit the described invariants.

However, the approach is also limited in that one has to keep almost all possible cascade paths (equivalent to all possible filter combinations) according to the model to achieve general invariance. Only if the invariance group, which solves the problem at hand is known a priori, one can hard code the invariance network to reduce the feature dimensionality. This is effective when the problem and its invariances are known precisely, but for many image processing applications this is rarely the case. And, the reference does allow for infinite group invariances. In this work, we aim to devise an algorithm combining the best of both worlds: to be inspired by the use of a wavelet-basis to achieve low-data learning capacity of the scattering convolutional network, while still achieving the full learning capacity of the Convolutional Neural Network (CNN)-approach without the need to specify the invariance classes a priori.

Other attempts to tackle the complicated and extensive training in convnets, rely heavily on regularization and data augmentation for example by dropout. The maxout networks (Goodfellow, 2013) leverage dropout by introducing a new activation function. The approach improved state of the art results on different common vision benchmarks. Another perspective on reducing sample complexity has been made by Gens and Domingos (2014) by introducing deep symmetry networks. These networks apply non-fixed pooling over arbitrary symmetry groups and have been shown to greatly reduce sample complexity compared to convnets on NORB and and rotated MNIST digits when aggregated over the affine group. Also focussing on modelling invariants is the convolutional kernel network approach introduced by Meiral et al. (2014) which learns parameters of stacked kernels. It achieves impressive classification results with less parameters to learn than a convnet. The many attempts to reduce model complexity, to reduce sample complexity, to regularize models more effectively, or to reduce training time of the convnet approach, may all be implemented independently in our method as well. In the experiments we focus on the simplest comparison, that is of the standard convnet with our standard receptive field net without these enhancements on neither side.

Convnets take an image, which in this case we consider to be a function f: $R^2 \rightarrow R$, as their input. Each convolutional layer produces feature maps as outputs by subsequent convolution with a sampled binary spatial aperture $w_{ij}$, application of a pooling operator and a nonlinear activation function. However, usually natural images are the sampled version of an underlying smooth function which can be sufficiently described by a set of appropriate smooth basis functions (Koenderink, structure of images). The family of Gaussian derivatives is known to be such a family of functions.

We assume, that not the simple functions expressed by the kernel's weights $w_{ij}$ are crucial for building invariances, but rather a learned combination of many such simple functions will exhibit the desired behaviour (Lecun Net with Bruna). For this reason we formulate the filter learning as a function approximation problem, which naturally introduces the Taylor expansion, as it can approximate any arbitrary continuous function.

A convolution in the receptive field network (RFnet) is using a convolution kernel F(x; y). In a standard CNN the values F(x; y) for all pixels (x; y) in a small neighbourhood are learned (as shared weights). In a RFNetwork the kernel function is of the form F(x; y)=Gs(x; y)f(x; y) where Gs is the Gaussian function that serves as an aperture defining the local neighbourhood. It has been shown in scale space theory (see Koenderink, SOI, Ter Haar Romeny, Book) that a Gaussian aperture leads to more robust results and that is the aperture that doesn't introduce spurious details (like ringing artefacts in images). The function f is assumed to be a linear combination of basis functions:

$$f(x,y) = \alpha_1 \phi_1 + \ldots + \alpha_n \phi_n$$

Instead of learning function values F(x; y) (or f(x; y)) in a RFNetwork the weights $\alpha_i$ are learned. If we select a complete function basis we can be confident that any function F can be learned by the network. There are several choices for a complete set of basis functions that can be made. The simplest perhaps are the monomial basis functions:

$$1, x, y, \frac{1}{2!}x^2, xy, \frac{1}{2!}y^2, \frac{1}{3!}x^3, \frac{1}{2!}x^2y, \frac{1}{2!}xy^2, \frac{1}{3!}y^3, \ldots$$

These are the functions that appear in a Taylor series expansion of a function f and thus we call this basis the Taylor basis. In this case we can view the problem of learning a filter in the RFnet as a function approximation problem, where we learn an approximation of the convolution kernel F(x; y). For illustration we restrict ourselves to a first order Taylor polynomial, so then the convolution kernel is:

$$F = G^s g = G^s f(0) + G^s f_x(0) x + G^s f_y(0) y. \quad (1)$$

Where G is the Gaussian aperture with a given standard deviation α=s and we are approximating an underlying function g(x; y). Now we define the basis Bm(x; y) and the to be learned parameters $\alpha_m$ as follows:

$$B_0 = G^s; B_1 = G^s x; B_2 = G^s y; \alpha_0 = f(0); \alpha_1 = f_x(0); \alpha_2 = f_y(0). \quad (2)$$

Including orders up to the power of nth in the Taylor expansion, it follows:

$$F = \alpha_0 B_0 + \alpha_1 B_1 + \alpha_2 B_2 + \ldots + \alpha_n B_n \quad (3)$$

Hence, the Taylor basis can locally synthesize arbitrary functions with a spatial accuracy of σ, where the bases are constant function-kernels and the function only depends on the parameters αm. However, it is possible to choose multiple bases based on this approach. A closely related choice is the basis of the Hermite polynomials:

$$1, 2x, 2y, 4x^2 - 2, 4y^2 - 2 \ldots$$

Figure 3:
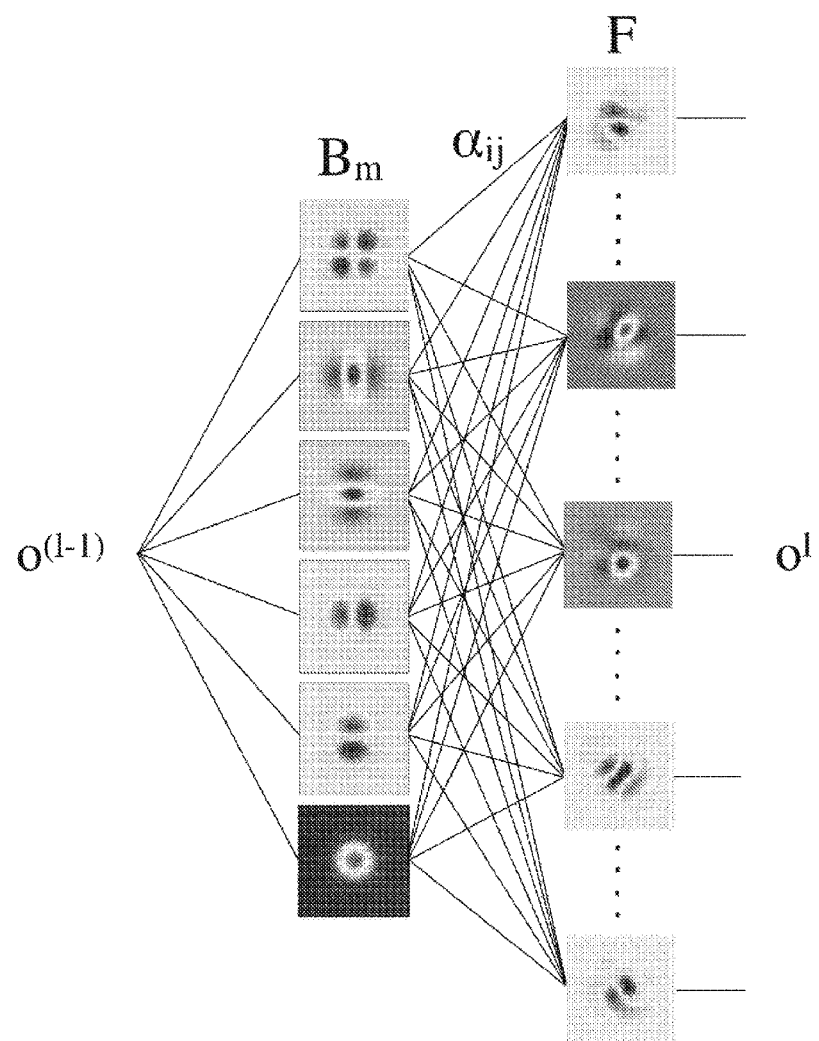
FIG. 3 a representation of the method and device.

FIG. 3 shows one convolutional layer of the RFnet (not showing pooling and activation which in an embodiment are standard in our case). To the left the image I(x; y) or a feature map from a previous layer, which will be convolved with the filters in the first column. The first column displays the Hermite basis up to second order under the Gaussian aperture function. This is preprogrammed in any layer of the RFnet. In the second column Fx displays the effective filters as created by α-weighted sums over the basis functions. Note that these filters visualized here as they are effective combinations of first column, which do not exist in the RFnet at any time. Note also that basis functions can produce any desired number of different filters.

It has been shown, that any derivative of the Gaussian function, which is our aperture, can be written as the multiplication of the Gaussian function with a Hermite polynomial. Using the Hermite basis we are thus using convolution kernels that are linear combinations of Gaussian derivatives. Both the Taylor basis and the Hermite basis are complete bases: any function F can be written as a linear combination of the basis functions. The mathematical identity requires the summation of an infinite amount of basis functions. Truncating the summation sequence at say m basis functions leaves us with an approximation of the arbitrary function F.

Observe that the Taylor basis and the Hermite basis are completely equivalent from a mathematical point of view. Any Hermite polynomial (up to order n) can be written as a linear combination of Taylor monomials (up to order n) and vice versa. Another basis that is often used to model the visual front-end are the Gabor functions. These are kernel functions that multiply the Gaussian aperture with sine/cosine functions of varying frequency. The learned a's interpretation changes from bases to bases. In the Taylor series, they are the learned functions derivatives under an aperture, whereas in the Hermite polynomial they denote slightly more complex meaning. Hence the exact form of the parameters am depends on the chosen parameterization of the basis functions. In this study we use the Hermite basis for the experiments below, as there is evidence that the receptive fields in the human visual brain can be modeled as linear combinations of Gaussian derivative functions. To show the properties of the RFnet, we use the Taylor basis, and directly apply it experimentally to approximate natural image patches in the experiment below.

REFERENCES

Young, The Gaussian derivative model for spatial vision
Koenderink, SOI Koenderink, Receptive Field Families
Bart ter Haar Romeny, Front-End Vision and Multi-Scale Image Analysis Lillholm, Statistics and category systems for the shape index descriptor of local 2nd order natural image structure Convnets are typically trained with the backpropagation algorithm (see Y. LeCun, Y. Bengio, and G. Hinton. Deep learning. Nature, 2015, incorporated by reference). The gradient of the error function at the network's output is calculated with respect to all parameters in the network by applying the chain rule and doing a layer-wise backward pass through the whole network. For convolutional neural networks, the weights to be learned are the filter kernels. Traditionally, the filter kernels are randomly initialized and updated in a stochastic gradient decent manner. In our approach, the parameters of the convolutional layers are the parameters of the taylor approximators a as shown in equation above. These taylor approximators a are learned in a mini-batch gradient decent framework.

To solve the learning problem, we need to efficiently compute the derivative of the loss function respect to the parameters $\alpha$. Taking the derivative of the loss function E with respect to the parameters $\alpha$ is done by applying the chain rule:

$$\frac{\partial E}{\partial \alpha_{ij}^l} = \sum_n \underbrace{\frac{\partial E}{\partial \alpha_{jn}^l} \frac{\partial o_{jn}^l}{\partial t_{jn}^l}}_{\delta_{jN}^l} \underbrace{\frac{\partial t_{jn}^l}{\partial \alpha_{ij}^l}}_{D_c} \quad (4)$$

Here E is the loss function. l denotes the current layer, i indexes the input feature map, j the output feature map and n indexes the neuron of the j-th feature map. $\alpha_{ij}^l$ are the parameters between the i-th input feature map and the j-th output feature map of layer l. $o_{jn}^l$ is the n-th neural value of the j-th output feature of the layer l. $t_{jn}^l$ is output feature before the rectifier-activation function is applied to $o_{jn}^l$ ($o_{jn}^l = \phi(t_{jn}^l)$). In an embodiment, we use the rectifier function as widely used in deep neural networks. To solve equation 4, we split it into two parts, $\delta_{jn}^l$ and the derivative of the convolutional function Dc. For the first part $\delta_{jn}^l$, it is trivial to solve if l is the last layer. For the inner layers, by applying the chain rule, $\delta_{jn}^l$ is:

$$\delta_{jn}^l = = \left( \sum_k \sum_q \delta_{kq}^{l+1} (\alpha_{ij1} \cdot B_1 + \alpha_{ij2} \cdot B_2 + \ldots + \alpha_{ijM} \cdot B_M) \right) \phi'(t_{jn}^l) \quad (5)$$

Here, k is the feature map index of the layer l+1 and q is the neural index of feature map k on the layer l+1. $\phi'(t_{jn}^l)$ is

---

Algorithm 1
RFnet Learning - updating the parameters $\alpha_{ij}^l$ between input map indexed by i and output map indexed by j of layer l in the Mini-batch Gradient Decent framework.

1: Input: input feature maps $o_i^{l-1}$ for each training sample (computed for the previous layer, $o^{l-1}$ is the input image when l = 1), corresponding ground-truth labels $\{y_1, y_2, \ldots, y_K\}$, the basic kernels $\{B_1, B_2, \ldots, B_M\}$, previous parameter $\alpha_{ij}^l$.
2: compute the convolution $\{\zeta_1, \zeta_2, \ldots, \zeta_m\}$ of $\{o_i^{l-1}\}$ respect to the basic kernels $\{B_1, B_2, \ldots, B_M\}$
3: obtain the output map $o_j^l = \alpha_{ij1}^l \cdot \zeta_1 + \alpha_{ij2}^l \cdot \zeta_2 + \ldots + \alpha_{ijM}^l \cdot \zeta_M$
4: compute the $\delta_{jn}^l$ for each output neuron n of the output map $o_j^l$ by equation (7)
5: compute the derivative $\phi'(t_{jn}^l)$ of the activation function
6: compute the gradient $\frac{\partial E}{\partial \alpha_{ij}^l}$ respect to the weights $\alpha_{ij}^l$ using equation (7)
7: update parameter $\alpha_{ij}^l = \alpha_{ij}^l - r \cdot \frac{1}{K} \cdot \sum_{k=1}^{K} \left[ \frac{\partial E}{\partial \alpha_{ij}^l} \right]_k$, r is the learning rate
8: Output: $\alpha_{ij}^l$, the output feature maps $o_j^l$ the derivative of the activation function. In our network, rectifier function is used as the activation function. The second part of the equation 4 is only dependent on the parameters $\alpha_{ij}$ and can thus be calculated as follows if $o^{l-1}_{jn}$ denotes the output feature map of layer l-1 (which is also the output feature of layer l), the second part of the equation can be calculated as:

$$D_c = \qquad (6)$$

$$\frac{\partial t^l_{jn}}{\partial \alpha_{ij}} = \frac{\partial [o^{l-1}_i \cdot (\alpha_{ij1} \cdot B_1 + \alpha_{ij2} \cdot B_2 + \ldots + \alpha_{ijM} \cdot B_M)]}{\partial \alpha_{ij}} = \begin{bmatrix} o^{l-1}_i \cdot B_1 \\ o^{l-1}_i \cdot B_2 \\ o^{l-1}_i \cdot \ldots \\ o^{l-1}_i \cdot B_M \end{bmatrix}$$

Bm where m is an element of $\{1, 2, 3, \ldots, M\}$ denotes the irreducible basis functions of the taylor approximators up to the order M. By substituting the two terms, we are able to calculate the derivative of the error with respect to all parameters in the network. The result is as follows:

$$\frac{\partial E}{\partial \alpha^l_{ij}} = \sum_n \sigma^l_{jn} \cdot \begin{bmatrix} o^{l-1}_i \cdot B_1 \\ o^{l-1}_i \cdot B_2 \\ o^{l-1}_i \cdot \ldots \\ o^{l-1}_i \cdot B_M \end{bmatrix} \qquad (7)$$

wrt. $\delta^l_{jn} =$ $$\begin{cases} (y - t)\phi'(t^l_{jn}) & l \text{ is the last layer} \\ \sum_k \sum_q \delta^{l+1}_{kq}(\alpha_{ij1} \cdot B_1 + \alpha_{ij2} \cdot B_2 + \ldots + \\ \alpha_{ijM} \cdot B_M))\phi'(t^l_{jn}) & l \text{ is an inner layer} \end{cases}$$

The algorithm shows how the parameters are updated.

Reducing Number of Convolutions

When training the network, we convolve our learned filters F(x; y) with an image I(x; y). We have derived the equation for our filters parameters in ??. Due to the convolution being a linear operator, we can first convolve I(x; y) with the bases Bm and only afterwards multiply with the learned am parameters. So we can rewrite as:

$$F(x, y) * I(x, y) = \begin{bmatrix} \alpha_0 \\ \ldots \\ \alpha_m \end{bmatrix} \cdot \begin{bmatrix} I(x, y) * B_0(x, y) \\ \ldots \\ I(x, y) * B_m(x, y) \end{bmatrix} \qquad (8)$$

The consequence is, that by convolving the input of each layer with the basis filters (specified in number only by their order) and taking the α-weighted sum, we can effectively create responses to any number and shape of filters. This makes RFnet largely independent of number of filters present in each layer, as a summation over basis-outputs is all that is needed. This decomposition of arbitrary filters is especially beneficial for large numbers of filters per layer and big filter sizes. Considering a single convnet layer with 128 channels input, 256 channels output and a filter size of 5×5 pixels, in this case 32768 single 2D filters have to be convolved and 819200 parameters have to be learned. When applying our receptive fields approach, we are able to generate 32768 effective filter responses by convolving with the inputs 1920 times, that is 128 channels each convolved with 15 basis functions upto order four. We only have to learn 491520 parameters, that is 128 channels each is 15 basis functions times 128 channel inputs times 256 outputs. The number is only needed when the full basis set of filters up to the fourth order is in use, which is often not even needed. For MNIST for instance, a second order basis suffices, which means 98304 parameters to learn for a layer of 128*256 filters. To conclude, our approach requires more than an order of magnitude less convolutions or even less with only roughly having half up to an eigth of the number of parameters to learn, depending on the choice of basis. This is very promising, as the convolution operations have been found to be the bottleneck in fast training of convolutional networks.

Experiments

We present two experimental parts. The first focuses on comparison between four different convolutional architectures, on small datasets sampled from the MNIST-dataset (see Yann LeCun, L'eon Bottou, Yoshua Bengio, and Patrick Haffner. Gradient-based learning applied to document recognition. Proceedings of the IEEE, 86(11):2278-2324, 1998) to validate the ability of the RFnet to achieve competitive results on two object classification benchmarks, while showing more stable results on small training set sizes compared to the other approaches. The dataset sizes are chosen according to M. Ranzato, F.-J. Huang, Y-L. Boureau, and Y. LeCun. Unsupervised learning of invariant feature hierarchies with applications to object recognition. CVPR, 2007.

In the second part, we demonstrate pratical properties of the receptive fields approach. We approximate a natural image patch and benchmark the time benefit of the reduction in convolutions in an RFnet layer, compared to a classical convolutional network layer. All experiments were conducted in Theano. In the test phase, we always test on all examples of the test set and report the average error. The second dataset is the CIFAR-10 benchmark, to demonstrate classification on natural color images.

Image Classification with Small Sample Sizes

In this part we compare four convolutional architectures: i) Our own RFnet, with identical setup as our own implementation of ii) a published convnet architecture (Zeiler, Hinton), iii) the best published convnet results on MNIST with small training set size without data augmentation (Lecun) and iv) the convolutional scattering network approach that excels on MNIST, as an example of a predefined convnet. To also show that the RFnet can handle natural color images, we further compare it with our convnet implementation on the CIFAR-10 benchmark with the same approach and show the differences in training for various training set sizes.

The convnet implementation and experimental setup is chosen according to Zeiler et al. and is identical for our own implementations of the RFnet and the convnet. The convnet and the RFnet consist of 3 convolutional layers, where the last convolutional layer is fully connected to the 10 softmax outputs. After each convolutional layer, max pooling with a kernel size of 3×3 and a stride of 2 is applied, subesequently followed by local response normalization and a rectified linear unit activation function. Each convolutional layer consists of 64 filter kernels, with size of 5×5 pixels each, 7×7 respectively for the RFnet to compensate for the degrading aperture. On all weights of the last layer, dropout of 0.5 was applied and on all weights of the convolutional layers dropout of 0.2. We calculate crossentropy loss as errorfunction and the network is trained for 280 epochs with adadelta. Batch size for the convnet is 100 and the learning rate 1.0 at the beginning of training, linearly decreasing for each epoch until it reaches 0.01 after 280 epochs. As the RFnet's parameters are of different nature, we changed two parameters, we chose a batch size of 50 and a learning rate of 5.0 linearly decreasing to 0.05 after 280 epochs. The number of hermite bases. For MNIST it is 6 for all layers. For Cifar-10 we chose a basis of 10 in the first layer and a basis of 6 for all other layers. The architecture were trained on CIFAR-10 and MNIST with various training set sizes. The obtained results of the convnet are in line with the results reported in the original reference (M. D. Zeiler and R. Fergus. Stochastic pooling for regularization of deep convolutional neural networks. ICLR, 2013).

Figure 4A:
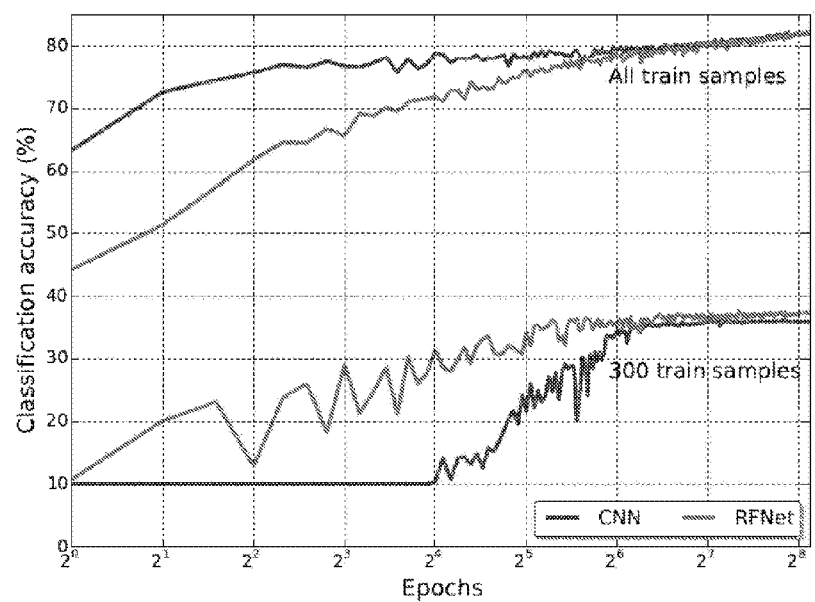
FIG. 4a, 4b both architectures trained on 300 randomly selected samples of MNIST and 300 randomly selected samples of CIFAR-10 on the bottom and trained on the full training sets on the top
Figure 4B:
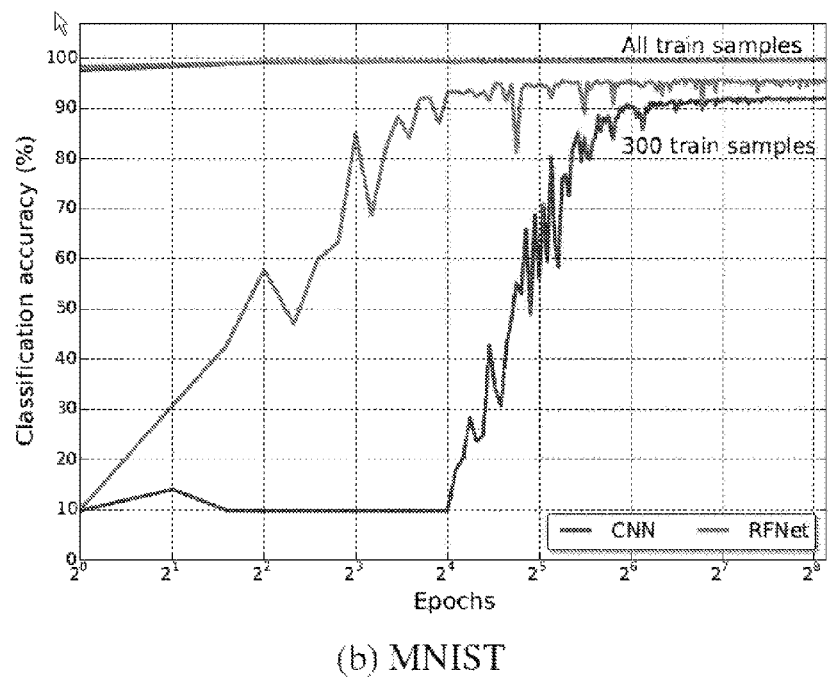

FIGS. 4a and 4b show both architectures trained on 300 randomly selected samples of MNIST and 300 randomly selected samples of CIFAR-10 on the bottom and trained on the full training sets on the top. The RFnet is much more stable and directly starts to converge for small training set sizes on both datasets. In comparison, the convnet remains at random predictions for a number of epochs, before it starts to converge. Furthermore, the final predictions are more accurate for the RFnet for small sample size. Training on the full set converges somewhat slower for the RFnet compared to the convnet. However, the final accuracy after 280 epochs is very similar, slightly worse for MNIST and slightly better for CIFAR-10.

| Train Samples | RFNet | CNN A | CNN B | Scattering |
|---|---|---|---|---|
| 300 | 4.33 | 8.10 | 7.18 | 4.70 |
| 1000 | 2.28 | 3.69 | 3.21 | 2.30 |
| 2000 | 1.57 | 2.06 | 2.53 | 1.30 |
| 5000 | 0.93 | 1.32 | 1.52 | 1.03 |
| 10000 | 0.81 | 0.83 | 0.85 | 0.88 |
| 20000 | 0.69 | 0.69 | 0.76 | 0.58 |
| 40000 | 0.47 | 0.47 | 0.65 | 0.53 |
| 60000 | 0.47 | 0.42 | 0.53 | 0.43 |

Figure 6:
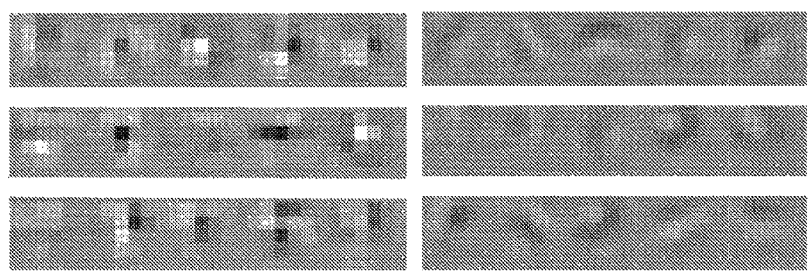

FIG. 6 illustrates the filters before and after training on MNIST.

Practical Properties of the Receptive Fields Network

The second part focuses on the properties of the receptive fields, namely their expressiveness and computational efficiency. We benchmark a standard convolutional layer for a forward and backwards pass, compared to an RFnet layer with the same number of feature maps and vary size, as well as number of convolution kernels. Furthermore we approximate natural image patches with a Taylor basis, to literally illustrate the expressiveness of our approach. The size and the number of convolution kernels varies as indicated.

Figure 5:
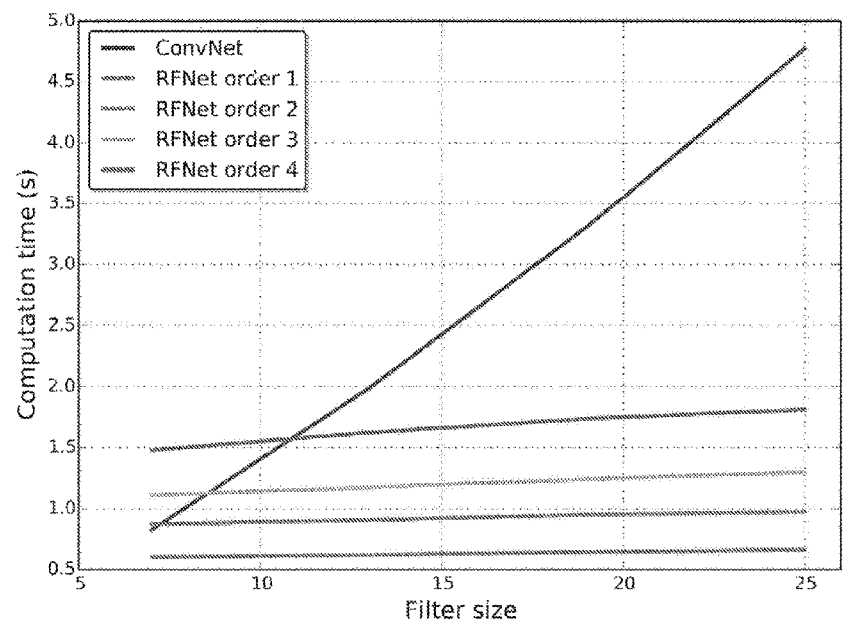
FIG. 5: Computation time vs the size of the convolution filter. Note that RFNets depend mostly on the order of the function basis, and FIG. 6 RFNet filters before (left) and after training (right) for 2 epochs on MNIST.

For the timing experiment we use 96×96 input images with 32 input channels, convolved with 64 filters where we vary the kernel size as 6σ, after which the Gaussian aperture tends to zero. To best show our theoretical improvement, we measure computation time on the cpu. In FIG. 5 we illustrate that our approach is less sensitive to the filter kernel size. In a RFNet, the number of convolutions depends on the order of the function basis, not on the number of pixels in a particular filter. FIG. 5 shows Computation time vs the size of the convolution filter. Note that RFNets depend mostly on the order of the function basis.

FIG. 6 shows RFNet filters before (left) and after training (right) for 2 epochs on MNIST. Note how our filters adapt to the task, and exhibit smooth contours already after two epochs of training.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A method performed by a computing system for recognition of information in digital image data, the method comprising:
    a learning phase on a data set of example digital images having known information, wherein the learning phase comprises:
        computing characteristics of categories automatically from each example digital image;
        comparing computed characteristics to their known category;
        training a convolutional neural network comprising network parameters using the data set of example digital images having known information,
            wherein via deep learning each layer of the convolutional neural network is represented by a linear decomposition into basis functions of all filters as learned in each layer; and
        using a receptive field network (RFnet) including a convolution kernel F(x; y) of the form $F(x; y) = G^s(x,y)f(x,y)$,
            where $G^s$ is a Gaussian function that serves as an aperture defining a local neighborhood of pixels with coordinates (x,y) in the sample digital image, and f(x,y) is a function that can be expressed as a linear combination of basis functions;
        wherein a series of basis functions $B_m(x,y)$ and to-be-learned parameters $\alpha_m$ (where m is an index) include the following terms:

$$B_0 = G^s;\ B_1 = G^s x;\ B_2 = G^s y;\ \alpha_0 = f(0);\ \alpha_1 = f_x(0);\ \alpha_2 = f_y(0)$$

where x and y are pixel coordinates in the sample digital image, where f(0) represents function f(x, y) at local coordinates (0,0), and where $f_x(0)$ and $f_y(0)$ represent derivatives of function f(x,y) at local coordinates (0,0) with subscript indicating differentiation with respect to x or y, respectively, measured by the Gaussian linear filter of the same derivative order.

2. The method of claim 1, wherein the network parameters of the convolutional layers are parameters expressing weights of each member in a set of basis functions selected from a Taylor expansion and a Hermite expansion, for providing approximators for a local image structure by adapting said network parameters during training.

3. The method of claim 1, further comprising preprogramming the basis functions in the network as Gaussian-shaped filters to decompose the filters.

4. The method of claim 1, wherein the basis functions are selected from a set of monomial basis functions:

$$1,\ x,\ y,\ \frac{1}{2!}x^2,\ xy,\ \frac{1}{2!}y^2,\ \frac{1}{3!}x^3,\ \frac{1}{2!}x^2 y,\ \frac{1}{2!}xy^2,\ \frac{1}{3!}y^3,\ \ldots$$

for learning function values, where x and y are pixel coordinates in the sample digital image.

5. A method for recognition of categorical information from digital image data, the method comprising:

providing a trained neural network, trained in a computing system using a learning phase on a data set of example digital images having known information, wherein the learning phase comprises:
computing characteristics of categories automatically from each example digital image;
comparing computed characteristics to their known category;
training a convolutional neural network comprising network parameters using the data set of example digital images having known information,
wherein via deep learning each layer of the convolutional neural network is represented by a linear decomposition into basis functions of all filters as learned in each layer; and
using a receptive field network (RFnet) including a convolution kernel F(x; y) of the form F(x; y)=$G^s$(x,y)f(x,y),
where $G^s$ is a Gaussian function that serves as an aperture defining a local neighborhood of pixels with coordinates (x,y) in the sample digital image, and f(x,y) is a function that can be expressed as a linear combination of basis functions;
wherein a series of basis functions $B_m(x,y)$ and to-be-learned parameters $\alpha_m$ (where m is an index) include the following terms:

$$B_0=G^s;\ B_1=G^s x;\ B_2=G^s y;\ \alpha_0=f(0);\ \alpha_1=f_x(0);\ \alpha_2=f_y(0)$$

where x and y are pixel coordinates in the sample digital image, where f(0) represents function f(x, y) at local coordinates (0,0), and where $f_x(0)$ and $f_y(0)$ represent derivatives of function f(x,y) at local coordinates (0,0) with subscript indicating differentiation with respect to x or y, respectively, measured by the Gaussian linear filter of the same derivative order.

* * * * *